(12) United States Patent
Yamazaki et al.

(10) Patent No.: US 12,106,566 B2
(45) Date of Patent: Oct. 1, 2024

(54) IMAGE PROCESSING APPARATUS THAT MANAGES CHECKING WORK PERFORMED ON ARTICLES AND IMAGE PROCESSING METHOD THEREOF

(71) Applicant: TOSHIBA TEC KABUSHIKI KAISHA, Tokyo (JP)

(72) Inventors: Keita Yamazaki, Mishima Shizuoka (JP); Masaaki Yasunaga, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 1017 days.

(21) Appl. No.: 17/017,593

(22) Filed: Sep. 10, 2020

(65) Prior Publication Data

US 2021/0081678 A1 Mar. 18, 2021

(30) Foreign Application Priority Data

Sep. 17, 2019 (JP) ................. 2019-168766

(51) Int. Cl.
*G06V 20/52* (2022.01)
*G06F 16/51* (2019.01)
*G06Q 10/0639* (2023.01)
*G06Q 10/087* (2023.01)
*G06V 40/10* (2022.01)
*G06V 40/16* (2022.01)
*G08B 5/22* (2006.01)

(52) U.S. Cl.
CPC ............. *G06V 20/52* (2022.01); *G06F 16/51* (2019.01); *G06Q 10/06398* (2013.01); *G06Q 10/087* (2013.01); *G06V 40/107* (2022.01); *G06V 40/161* (2022.01); *G08B 5/22* (2013.01)

(58) Field of Classification Search
CPC .... G06V 20/52; G06V 40/107; G06V 40/161; G06V 40/103; G06V 40/28; G06F 16/51; G06F 16/909; G06Q 10/06398; G06Q 10/087; G08B 5/22
See application file for complete search history.

(56) References Cited

U.S. PATENT DOCUMENTS

| | | | |
|---|---|---|---|
| 6,919,795 B2 * | 7/2005 | Roseen ................ | G06Q 10/087 340/568.1 |
| 9,466,045 B1 * | 10/2016 | Kumar ................. | G06Q 10/087 |
| 10,133,933 B1 * | 11/2018 | Fisher .................... | G06V 20/41 |
| 10,378,912 B2 * | 8/2019 | Rodini ................. | G01S 5/0269 |

(Continued)

FOREIGN PATENT DOCUMENTS

JP 2016081364 A 5/2016

*Primary Examiner* — Mia M Thomas
(74) *Attorney, Agent, or Firm* — Kim & Stewart LLP (57) ABSTRACT

According to an embodiment, an image processing apparatus includes an input interface, a memory, and a processor. The input interface obtains a captured image obtained by imaging an imaging area including the shelf on which the article is arranged. The memory stores an article list showing the article arranged on the shelf. The processor detects the article for which the person in charge has done the checking work from the captured image obtained by the input interface. The processor outputs information indicating the article for which the person in charge has not done the checking work on the basis of the article list and a checked-article list showing the article for which the person in charge has done the checking work.

8 Claims, 6 Drawing Sheets

(56) References Cited

U.S. PATENT DOCUMENTS

| | | | |
|---|---|---|---|
| 10,387,912 B2* | 8/2019 | Farshori | G06Q 30/0253 |
| 11,562,614 B2* | 1/2023 | Wu | G06Q 30/0633 |
| 2014/0195373 A1* | 7/2014 | Bassemir | G06Q 10/087 |
| | | | 705/26.8 |
| 2017/0323281 A1* | 11/2017 | Jones | G07G 1/0081 |
| 2019/0228457 A1* | 7/2019 | Wu | G06V 40/28 |
| 2020/0202693 A1* | 6/2020 | Aoyama | H04N 7/188 |
| 2020/0302510 A1* | 9/2020 | Chachek | G06Q 30/0639 |
| 2020/0402139 A1* | 12/2020 | Higa | G07G 1/14 |
| 2021/0312414 A1* | 10/2021 | Jones | G06Q 20/208 |
| 2022/0198550 A1* | 6/2022 | Meidar | G06Q 20/20 |
| 2022/0374970 A1* | 11/2022 | Bronicki | G06Q 30/0633 |
| 2023/0122649 A1* | 4/2023 | Jones | G06Q 20/208 |
| | | | 705/28 |

* cited by examiner

IMAGE PROCESSING APPARATUS THAT MANAGES CHECKING WORK PERFORMED ON ARTICLES AND IMAGE PROCESSING METHOD THEREOF

CROSS-REFERENCE TO RELATED APPLICATION

This application is based upon and claims the benefit of priority from the prior Japanese Patent Application No. 2019-168766, filed on Sep. 17, 2019, the entire contents of which are incorporated herein by reference.

FIELD

An embodiment described here generally relates to an image processing apparatus and an image processing method.

BACKGROUND

From the past, at a retail store, an employee regularly patrols the store for checking the expiry dates of commodities arranged on shelves and/or rearranging commodities. However, which commodity the employee has checked is not traditionally managed. It is thus difficult to check if the employee has checked all the commodities arranged on the shelves in the store. In other words, there is a problem that it is difficult to detect whether an employee has not done such checking work for some of the commodities and has left them as they are at a traditional store. There is also a problem that it is difficult to check whether a person in charge has done checking work for each of articles arranged on shelves or the like also at a warehouse or the like where the articles are managed.

DETAILED DESCRIPTION

In accordance with one embodiment, an image processing apparatus manages checking work of a person in charge for an article arranged on a shelf. The image processing apparatus includes an input interface, a memory, and a processor. The input interface receives a captured image obtained by imaging an imaging area including the shelf on which the article is arranged. The memory stores an article list showing the article arranged on the shelf. The processor detects the article for which the person in charge has done the checking work from the captured image received by the input interface. The processor generates a checked-article list showing the article for which the person in charge has done the checking work. In addition, the processor outputs information indicating the article for which the person in charge has not done the checking work on the basis of the article list and the checked-article list.

Hereinafter, this embodiment will be described with reference to the drawings. The same reference signs in the drawings will denote the same or similar portions. The image processing apparatus according to the embodiment is used in a monitoring system that monitors an article (commodity) and a person's action on the basis of an image captured by a camera. The image processing apparatus estimates an action of a person located in front of a shelf on which an article is arranged on the basis of an image captured by the camera and detects whether the person has done checking work for the article arranged on the shelf. In addition, the image processing apparatus functions to recognize the article arranged on the shelf on the basis of the image captured by the camera. Accordingly, the image processing apparatus detects an article for which the person has not done checking work and informs of the position, the kind, and the like of the article for which the person has not done the checking work.

In the following embodiment, it is assumed that the shelf is installed in a store such as a retail store and commodities are arranged on the shelf. Further, it is assumed that an employee as a person in charge does checking work for the commodities arranged on the shelf. It should be noted that the image processing apparatus according to the embodiment and the monitoring system are not limited to those that detect checking work for the commodities arranged on the shelf in the store. For example, the shelf may be installed in a warehouse or the like and articles may be arranged on the shelf. A person who does checking work for each article may be a worker or manager in the warehouse.

Figure 1:
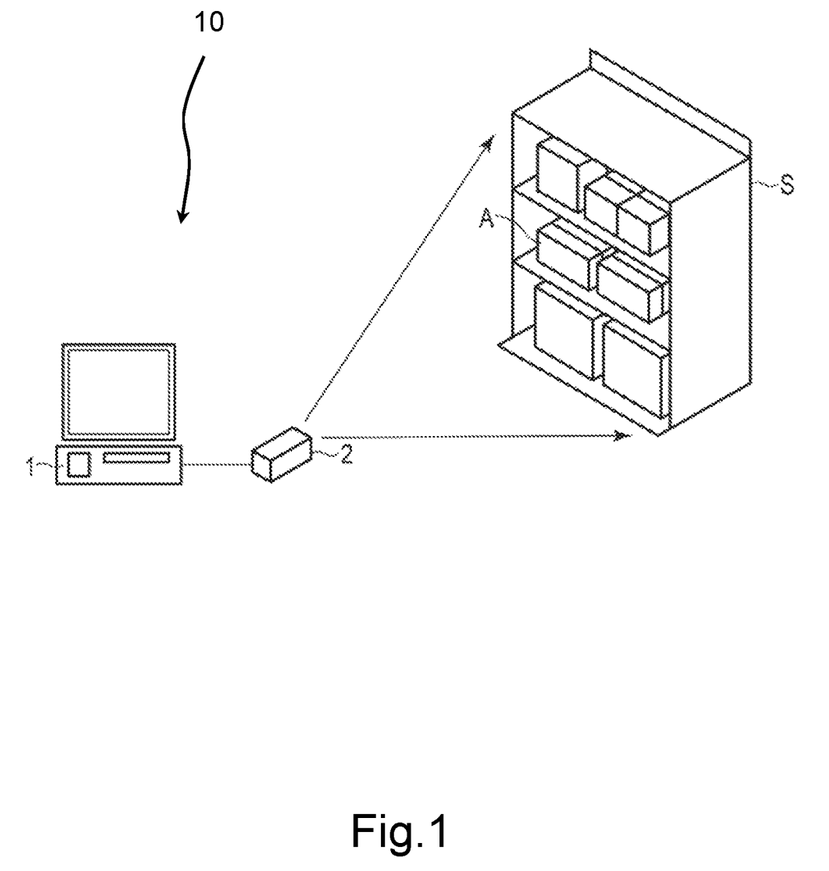
FIG. 1 is a diagram schematically showing an example of a monitoring system including an image processing apparatus according to an embodiment.

Hereinafter, the monitoring system including the image processing apparatus according to the embodiment will be described. FIG. 1 shows a configuration example of a monitoring system 10 including an image processing apparatus according to the embodiment. As shown in FIG. 1, the monitoring system 10 includes the image processing apparatus and a camera 2 that connects to the image processing apparatus 1. The image processing apparatus 1 obtains an image captured by the camera 2. The image processing apparatus 1 functions to instruct the camera 2 to capture an image and the like. The camera 2 is installed such that a shelf S on which an article A is arranged is an imaging area.

For example, the camera 2 is installed to face the shelf S on which the article A is arranged such that the camera 2 is capable of capturing an image of the entire shelf S and the person located in front of the shelf S. Further, the article A for which the person in charge needs to do checking work is arranged on the shelf S. The shelf S is installed in a region (store) where a person such as a person in charge moves. The camera 2 is installed such that the camera 2 is capable of capturing an image of a person who appears at a position at which the person can pick up the article A arranged on the shelf S (person who can access the article A).

Note that it is sufficient that the camera 2 is capable of capturing an image on the basis of which it can be detected whether or not the person in charge has done checking work for the article arranged on the shelf S. Further, the camera 2 may be a plurality of cameras 2. For example, the plurality of cameras may include a first camera installed to face the shelf S and a second camera installed at a position where the second camera is capable of capturing an image of a person who stands facing the shelf S from the front. Further, a camera that captures an image of the entire store as an overhead image may be additionally provided.

Figure 2:
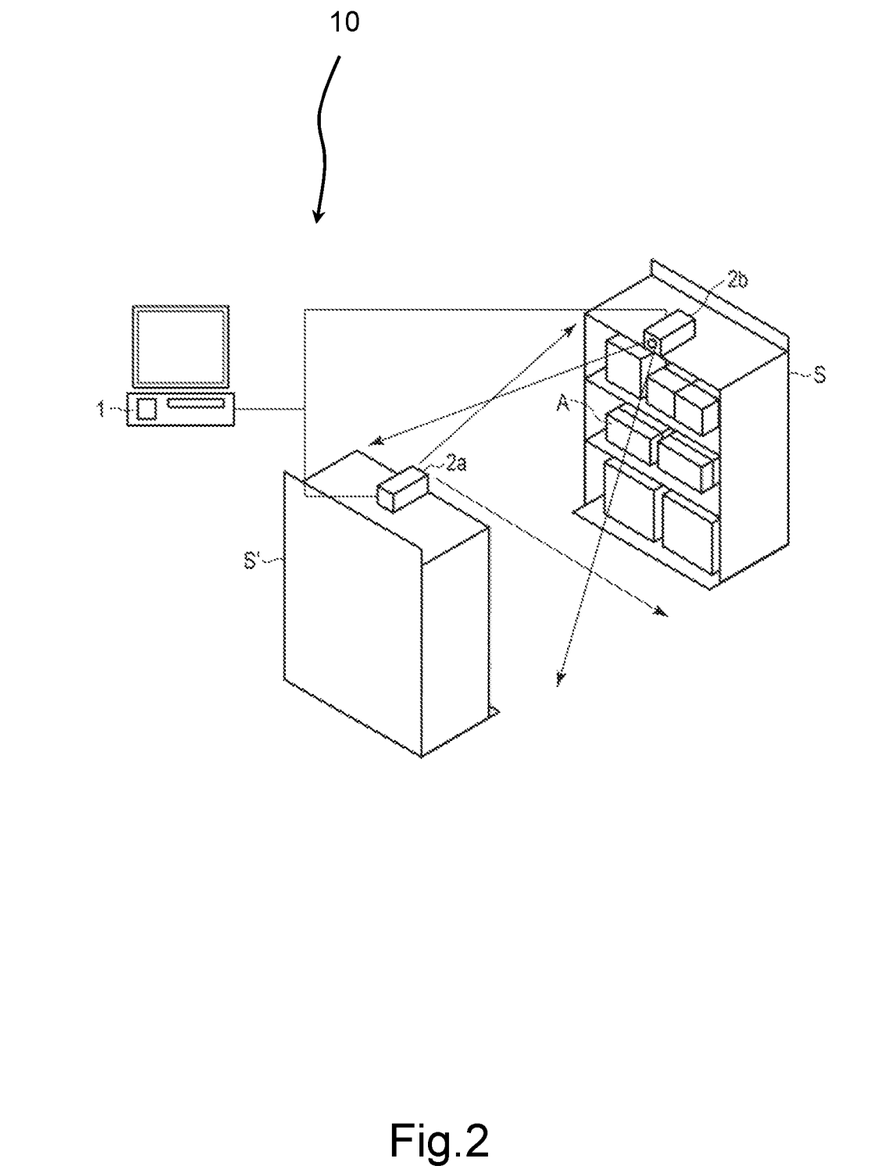
FIG. 2 is a diagram schematically showing another example of the monitoring system including the image processing apparatus according to the embodiment.

FIG. 2 shows the monitoring system provided with two cameras. In FIG. 2, the monitoring system 10 includes a first camera 2a and a second camera 2b that are connected to the image processing apparatus 1. The first camera 2a is installed such that the shelf S on which the article A is arranged is the imaging area. For example, the first camera 2a is installed to face the shelf S on which the article A is arranged. The second camera 2b is installed to capture an image of a person who stands facing the shelf S from the front. For example, the second camera 2b is installed such that the second camera 2b is capable of capturing an image of a person who accesses the article A arranged on the shelf S, the image of which the first camera 2a captures, from the front.

Further, in FIG. 2, the first camera 2a and the second camera 2b are installed on two shelves S and S' installed facing each other, respectively. The first camera 2a is installed such that the shelf S is its imaging area and the imaging area includes a person who can access an article A' on the shelf S' facing the shelf S. Further, the second camera 2b is installed such that the shelf S' is its imaging area and the imaging area includes a person who can access the article A on the shelf S facing the shelf S'. Accordingly, the first camera 2a is capable of capturing an image of the article A placed on the shelf S and the second camera 2b is capable of capturing an image of the front side of the person including the face of the person who stands facing the shelf S. It should be noted that the first camera 2a and the second camera 2b can be installed at any positions including the store ceiling, a deep side on the shelf, and the like as long as their imaging areas become the above-mentioned imaging areas.

Figure 3:
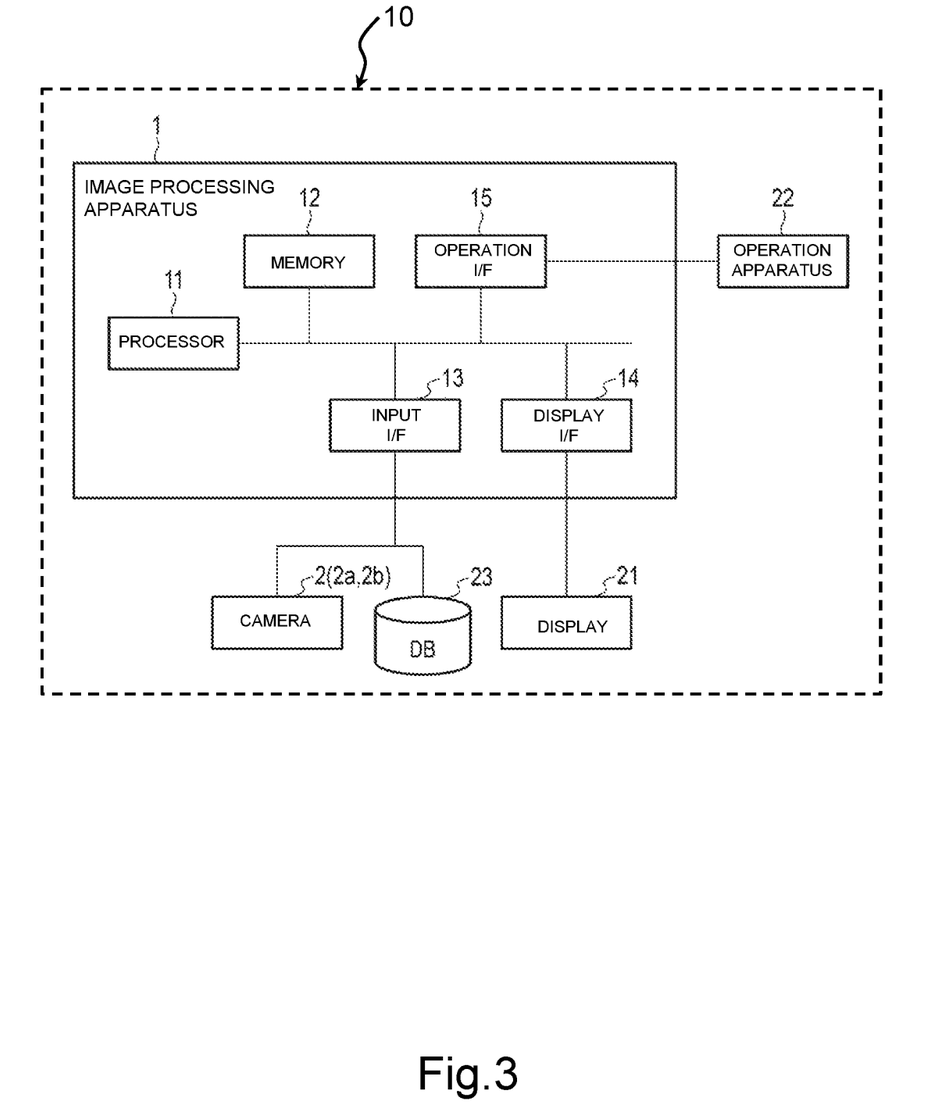
FIG. 3 is a block diagram showing an example of a control system of the image processing apparatus according to the embodiment.

Next, a configuration of a control system of the image processing apparatus 1 according to the embodiment will be described. FIG. 3 shows a configuration example of the control system in the image processing apparatus 1 according to the embodiment. As shown in FIG. 3, the image processing apparatus 1 includes a processor 11, a memory 12, an input interface (I/F) 13, a display I/F 14, an operation I/F 15, and the like. The processor 11 performs various types of processing by executing a program. The memory 12 includes a volatile memory (working memory) such as a RAM, a non-volatile memory (program memory) such as a ROM, a rewritable non-volatile memory (data memory), and the like.

For example, the processor 11 executes a program stored in the memory 12 to thereby achieve various types of processing to be described later such as article recognition processing, person detection processing, skeleton detection processing, determination processing for a person in charge, detection processing for checking work for an article, detection processing for an unchecked article, and informing processing for an unchecked article. In accordance with those processes, the memory 12 stores, as will be described later, an article list showing articles present on a shelf, a checked-article list showing articles for which the checking work has been done, and the like. Further, the memory 12 may store captured images and information such as person-detecting information and article-determining information. Here, the captured images are images captured by the camera 2. The person-detecting information is information for determining a person on the basis of an image and includes a threshold of a feature amount for person detection, which is included in the image, and the like. The article-determining information is information for determining an article on the basis of an image and includes a local feature amount included in the image and the like.

The input I/F 13 is an interface for communicably connecting to the camera 2. Further, in a case where the monitoring system 10 has the configuration shown in FIG. 2, the first camera 2a and the second camera 2b are connected to the input I/F 13. In a case where a plurality of cameras are used, the image processing apparatus 1 may include an interface for each camera.

The display I/F 14 is an interface for communicably connecting to a display 21 that displays information. The operation I/F 15 is an interface for connecting an operation apparatus 22 into which an operator inputs an operation instruction. Here, the display 21 and the operation apparatus 22 may include a display equipped with a touch panel.

It should be noted that the respective interfaces 13 to 15 may be communicably connected with wires or may perform wireless communication. Further, a database (DB) 23 provided in a storage unit of an external device may be connected to the input I/F 13 (see FIG. 3). The DB 23 may store, for example, captured images and information such as person-detecting information and article-determining information.

Figure 4:
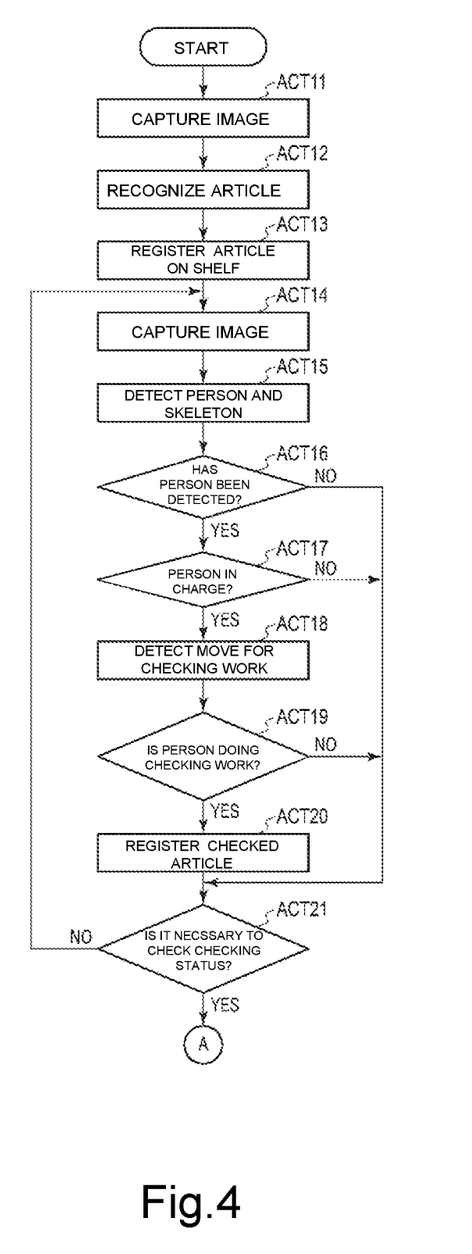
FIG. 4 is a flowchart showing an operation example of the image processing apparatus according to the embodiment.
Figure 5:
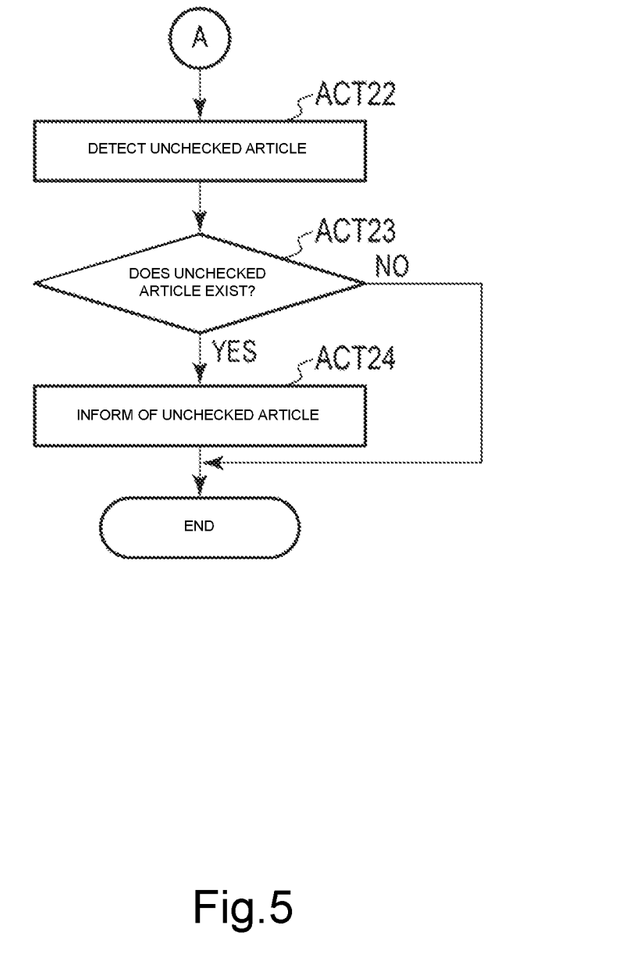
FIG. 5 is a flowchart showing an operation example of the image processing apparatus according to the embodiment.

Next, an operation of the monitoring system 10 including the image processing apparatus 1 according to the embodiment will be described. FIGS. 4 and 5 each show an operation example of the image processing apparatus 1 according to the embodiment. First of all, at ACT11 to ACT13 of FIG. 4, the processor 11 of the image processing apparatus 1 performs processing of recognizing commodities arranged on the shelf S. That is, in ACT11, the processor 11 causes the camera 2 to capture an image of the imaging area including the shelf S on which the articles are arranged. The camera 2 captures images in a predetermined cycle and sequentially provides the captured images to the processor 11 of the image processing apparatus 1 via the input interface 13. Further, as will be described later, the processor 11 recognizes the articles arranged on the shelf S on the basis of a captured image obtained from the camera 2 via the input interface 13. Therefore, the processor 11 obtains from the camera 2 an image captured in a state in which no people exist within the imaging area.

When the processor 11 obtains the captured image from the camera 2, the processor 11 performs, in ACT12, article recognition processing of recognizing each of the articles arranged on the shelf S on the basis of the captured image obtained from the camera 2. Specifically, the processor 11 detects the image of each article from the captured image and performs article recognition on the image of each article. In the article recognition, the processor 11 obtains the position of each article on the shelf S and the kind of each article.

In order to recognize the articles in the captured image, the processor 11 performs article recognition by using article-determining information for determining the article (e.g., dictionary information or article images serving as a dictionary) for example. The article-determining information is pre-stored in the DB 23. The article-determining information may be stored in the memory 12, for example. The processor 11 uses template matching, feature point matching, or the like as the article recognition method. It should be noted that any article recognition method can be employed as long as it can determine the position of the article in the captured image and the kind of the article.

When the processor 11 recognizes the article arranged on the shelf S on the basis of the captured image of the camera 2, the processor 11 stores in the memory 12 an article list showing the position and kind of each of the articles arranged on the shelf S in ACT13. The article list is information indicating the arrangement position on the shelf S and the kind for each article recognized in the article recognition.

After the article list including the article recognized on the basis of the captured image of the shelf S is stored in the memory 12, the processor 11 checks whether or not the person in charge has done the checking work for the article in ACT14 to ACT20. That is, in ACT14, the processor 11 causes the camera 2 to capture an image for detecting the checking work for the article by the person in charge. In order to detect a person's move from the captured image of the camera 2, the processor 11 obtains a plurality of captured images that the camera 2 successively captures in the predetermined cycle, for example.

In ACT15, the processor 11 performs processing of detecting the person and the skeleton from the image captured by the camera 2. For example, the processor 11 uses the person-detecting information stored in the memory 12 for detecting a person from the image captured by the camera 2. The person-detecting information is pre-stored in the DB 23. The person-detecting information may be stored in the memory 12, for example. Linear separation of histogram of gradients (HOG) or the like can be, for example, used as the person detection method.

Further, the processor 11 detects the skeleton (site of the person) by using skeleton-detecting information (e.g., dictionary information or threshold information). The skeleton-detecting information is pre-stored in the DB 23. The skeleton-detecting information may be stored in the memory 12, for example. OpenPose, PoseNet, or the like can be used for the skeleton detection. It should be noted that the skeleton detection is not limited to a particular method as long as it can detect the skeleton of the person detected from the captured image. Further, in this embodiment, the processor 11 detects the eyes, the ears, the hands, and the like from the captured image as skeletons. Further, the processor 11 detects skeleton information including the coordinates of the eyes, the ears, and the hands as information indicating each skeleton such as the eyes, the ears, and the hands.

Further, in ACT16, the processor 11 determines whether or not the processor 11 has detected a person from the captured image of the camera 2. In a case where the processor 11 determines that the processor 11 has detected a person from the captured image of the camera 2 (YES in ACT16), the processing of the processor 11 proceeds to ACT17. In ACT17, the processor 11 performs determination processing for the person in charge. In the determination processing for the person in charge, whether or not the detected person is the person in charge is determined. For example, the processor 11 determines whether or not the detected person is the person in charge (e.g., employee) by performing image processing on the captured image. For example, the processor determines whether or not the detected person is the person in charge on the basis of whether or not the detected person wears the clothes (uniform) for the person in charge.

Further, person in charge-determining information (e.g., dictionary information regarding the person in charge or images of a uniform for the person in charge) is used as the method of determining the person in charge. The person in charge-determining information is pre-stored in the DB. Further, the person in charge-determining information may be stored in the memory 12, for example. Template matching, feature point matching, or the like is used as the method of determining whether or not the person in the captured image is the person in charge. It should be noted that the determination method is not limited to a particular method as long as it can determine whether or not the person is the person in charge.

Further, in a case where the processor 11 determines that the processor 11 has not detected the person from the captured image of the camera 2 (NO in ACT16) or in a case where the processor 11 determines that the person in the captured image is not the person in charge (NO in ACT17), the processing of the processor 11 proceeds to ACT21. In ACT21, the processor 11 determines whether or not it is necessary to check a checking status for the article on the shelf. In a case where the processor 11 determines it is unnecessary to check the checking status for the article on the shelf (NO in ACT21), the processing of the processor 11 returns to ACT14. The processor 11 repeatedly performs the above-mentioned processing by repeating image capturing of the camera 2.

In a case where the processor 11 determines that the person detected from the captured image is the person in charge (YES in ACT17), the processing of the processor 11 proceeds to ACT18. In ACT18, the processor 11 detects a move of the determined person in charge from the image captured by the camera 2. The processor 11 detects a move (action) of the person in charge from the plurality of successively captured images. In ACT19, the processor 11 determines whether or not the person in charge is doing the checking work for the article on the basis of the move of the detected person in charge. The processor 11 determines whether or not the person in charge has done the move for the checking work for the article on the shelf on the basis of motions of the skeletons detected from the plurality of captured images, for example.

There are various methods as the method of detecting the checking work for the article by the person in charge. A first detection method is a method of detecting whether or not the person in charge is doing the checking work for the article on the basis of whether or not the person in charge is holding the article. In the first detection method, whether or not the person in charge is holding the article is detected on the basis of an image of a hand of the person in charge in the captured image.

For example, the processor 11 extracts (trims) an image of the periphery of the hand of the person in charge detected from the captured image. The processor 11 detects whether or not the person in charge is holding the article in the hand by template matching, feature point matching, or the like on the trimmed image of the periphery of the hand. In addition, the processor 11 determines that the person in charge is doing the checking work for the article when the person in charge is holding the same article for a predetermined time or more, for example.

Further, a second detection method is a method of detecting whether or not the person in charge is doing the checking work for the article on the basis of a direction of the face of the person in charge. In the second detection method, whether or not the face of the person in charge in the captured image is directed to the article. For example, the processor 11 determines the face direction on the basis of the coordinates of the eyes and the ears of the person in charge detected in the skeleton detection. The processor 11 determines an article located at a position on a straight line in the direction of the face of the person in charge.

Here, it is assumed that the face direction is three-dimensionally determined. In this case, the face direction can be used for determining an article gazed by the person in charge (article checked with the eyes) by pre-setting the position at which the person in charge (employee) stands (position relative to the shelf). For example, if the position at which the person in charge stands relative to the shelf S is set at a position at a predetermined distance from the shelf, the processor 11 is capable of determining which position on the shelf S the person in charge in the captured image is gazing. When the processor 11 determines the position gazed by the person in charge, the processor 11 determines that an article closest to the position determined as the one gazed is the article for which the checking work is being done. In addition, the processor 11 may determine that the person in charge is doing the checking work for the article when the person in charge is gazing the same article for a predetermined time or more.

In a case where the processor 11 detects that the person in charge is doing the checking work for the article (YES in ACT19), the processing of the processor 11 proceeds to ACT20. In ACT20, the processor 11 stores in the memory 12 the article for which the person in charge has done the checking work as a checked article. For example, the processor 11 generates a list (checked-article list) showing the article detected as the one for which the person in charge has done the checking work and stores the generated list in the memory 12. For example, the position of the article detected as the one for which the person in charge has done the checking work and the kind of the detected article are registered in the checked-article list. Further, the processor 11 may store the fact that checking has been done (the person in charge has done the checking work) associated with the article of the articles in the article list stored in the memory 12, which has been detected as the one for which the person in charge has done the checking work. The processor 11 repeatedly performs the above-mentioned processing of from ACT14 to ACT20 to thereby manage whether or not the checking work for each of the articles arranged on the shelf has been done.

Here, in a case of checking the status of the checking work for the article on the entire shelf or in the entire store, i.e., in a case where the processor 11 determines that it is necessary to check the checking status for the article on the shelf (YES in ACT21), the processing of the processor 11 proceeds to ACT22. In ACT22, the processor 11 detects an article (unchecked article) for which the person in charge has not done the checking work. For example, the processor 11 detects the unchecked article by matching the articles in the article list stored in the memory 12 with the articles in the checked-article list. In this case, the processor 11 determines an article of the articles in the article list, which is not found in the checked-article list, as the unchecked article.

Figure 6:
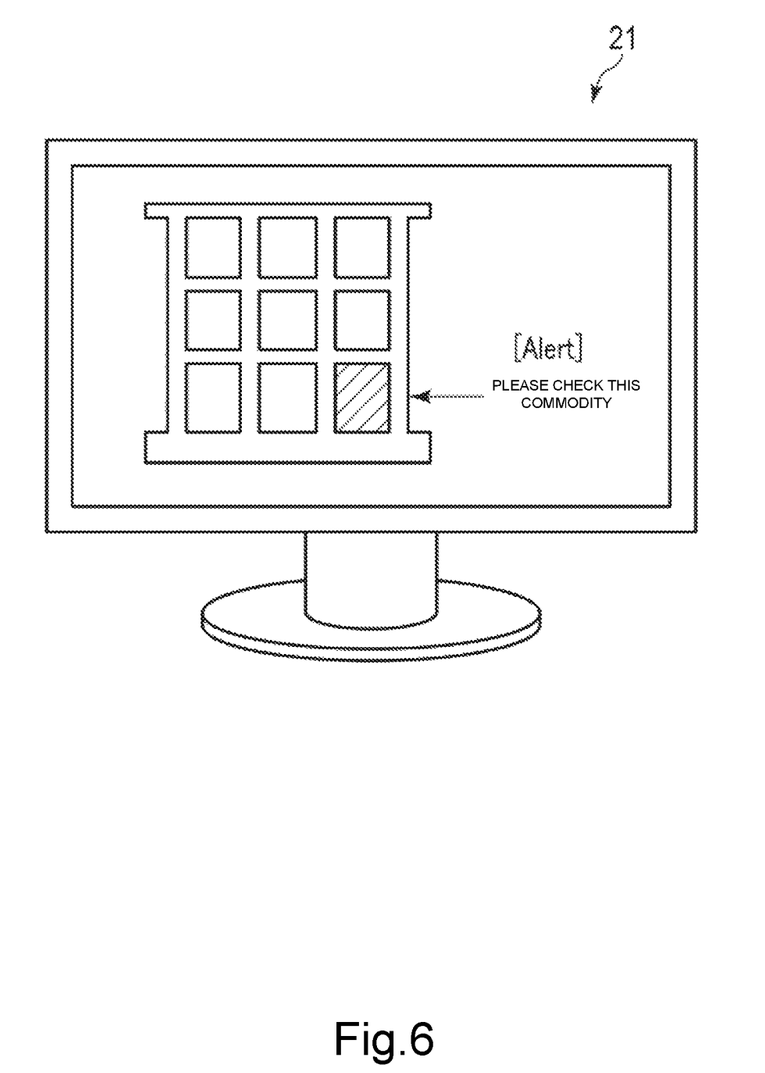
FIG. 6 is a diagram showing an example in which a display of the image processing apparatus according to the embodiment displays guidance for informing of an article for which a person in charge has not done checking work.

In ACT23, the processor 11 determines whether or not the unchecked article exists on the basis of the detection result. In a case where the processor 11 determines that the unchecked article exists (YES in ACT23), the processing of the processor 11 proceeds to ACT24. In ACT24, the processor informs of the fact that the unchecked article exists. For example, the processor 11 causes the display 21 to display the position of the article (unchecked article) for which the person in charge has not done the checking work. FIG. 6 shows a display example in which the display 21 displays a guidance for informing of the unchecked article. In the example shown in FIG. 6, the processor 11 causes the display 21 to display a picture of the shelf and also display the position at which the unchecked article exists in the picture of the shelf. Accordingly, the person in charge can easily know the article for which the checking work has not been done and its position. As a result, the image processing apparatus 1 is capable of prompting the person in charge to do the checking work for the article for which the checking work has not been done.

As described above, the image processing apparatus according to the embodiment includes the interface, the memory, and the processor for obtaining plurality of images including the articles and the shelf. The memory stores an article list (commodity position list) showing the articles arranged on the shelf and a checked-article list showing articles for which the person in charge has done the checking work. The processor performs person detection and skeleton detection on the captured image obtained by imaging the imaging area including the shelf. The processor determines whether or not the person detected from the captured image is the person in charge of checking work for the article. When the processor detects the person in charge from the captured image, the processor detects the article for which the person in charge has done the checking work. The processor registers the detected article in the checked-article list. After a predetermined period has elapsed, the processor considers that an article which is found in the commodity position list, not in the checked-article list, is the article for which the checking work has not been done, and outputs an alert.

Accordingly, it is possible to inform of the article for which the person in charge has not done the checking work for a long period. As a result, it is possible to reliably manage the checking work of the person in charge for each of the articles arranged on the shelf.

Further, in the image processing apparatus according to the embodiment, the processor detects whether or not the person in charge is doing the checking work on the basis of a move of the person in charge. For example, the processor detects whether or not the person in charge is holding the article on the basis of the image of the periphery of the position of the hand detected in the skeleton detection on the captured image. Then, when the processor detects that the person in charge is holding the article, the processor refers to the article list and determines an article closest to the position of the hand as the article for which the person in charge is doing the checking work. Further, the processor estimates a three-dimensional face direction on the basis of the positions of the eyes and the ears detected in the skeleton detection for the captured image. The processor estimates a position gazed by the person in charge in accordance with a distance to the shelf on the basis of the estimated face direction and the pre-set position at which the person in charge stands. Then, the processor determines the article located at a position closest to the position estimated as the one gazed as the article for which the checking work is being done.

Accordingly, it is possible to detect whether or not the checking work for the article arranged on the shelf has been done on the basis of the motion of each skeleton of the person in charge. As a result, it is possible to reliably manage the checking work of the person in charge for each of the articles arranged on the shelf.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus that manages checking work of a person in charge, for articles arranged on a shelf, the image processing apparatus comprising:
an input interface that receives a captured image obtained by imaging of an imaging area including the shelf on which the articles are arranged;
a memory that stores an article list showing the articles arranged on the shelf;
a display interface to which a display is connected;
and a processor that is configured to: determine, upon the captured image being received by the input interface, whether or not a person detected from the captured image is the person in charge;
determine, on a basis of an action by the person in charge, the action being detected from the captured image, that an article detected from the captured image is an article for which the person in charge has done the checking work
generate a checked-article list showing at least the article for which the person in charge has done the checking work;
determine an article for which the person in charge has not done the checking work, on a basis of the article list, which is stored in the memory, and the generated checked-article list;
and output via the display interface, information indicating the determined article for which the person in charge has not done the checking work.

2. The image processing apparatus according to claim 1, wherein
the processor is further configured to:
recognize a plurality of the articles arranged on the shelf from the captured image; and
register, in the stored article list, for each recognized article, an arrangement position of the article on the shelf and a kind of the article.

3. The image processing apparatus according to claim 1, wherein
the processor is further configured to:
control the memory to store the checked-article list; and
register, in the stored checked-article list, an arrangement position of the article detected from the captured image, which is on the shelf, and a kind of the detected article.

4. The image processing apparatus according to claim 1, wherein
the processor is further configured to:
detect a hand of the person in charge holding an article, as the action of the person in charge, the article held by the person in charge being the article for which the person in charge has done the checking work.

5. The image processing apparatus according to claim 1, wherein
the processor is further configured to:
detect the face of the person in charge facing a direction, as the action of the person in charge; and
detect an article present in the detected direction, the article present in the detected direction being the article for which the person in charge has done the checking work.

6. The image processing apparatus according to claim 1, wherein information indicating the determined article for which the person in charge has not done the checking work, includes a determined position of the determined article on the shelf.

7. The image processing apparatus according to claim 6, wherein
the processor is further configured to:
output via the display interface, an alert indicating the determined position of the determined article for which the person in charge has not done the checking work, to cause the display to display the alert.

8. An image processing method for an image processing apparatus that manages checking work of a person in charge for articles arranged on a shelf, the image processing method comprising:
obtaining, via an input interface of the image processing apparatus, a captured image that is obtained by imaging of an imaging area including the shelf on which the articles are arranged;
storing, in a memory of the image processing apparatus, an article list showing the articles arranged on the shelf;
determining whether or not a person detected from the captured image is the person in charge;
determining, on a basis of an action by the person in charge, the action being detected from the captured image, that an article detected from the captured image is an article for which the person in charge has done the checking work;
generating a checked-article list showing the article for which the person in charge has done the checking work;
determining an article for which the person in charge has not done the checking work, on a basis of the stored article list and the generated checked-article list; and
outputting via a display interface of the image processing apparatus, to which a display is connected, information indicating the determined article for which the person in charge has not done the checking work.

* * * * *